Oct. 23, 1951 G. C. COATES 2,572,109
GARDEN TRACTOR
Filed Dec. 10, 1947 2 SHEETS—SHEET 1
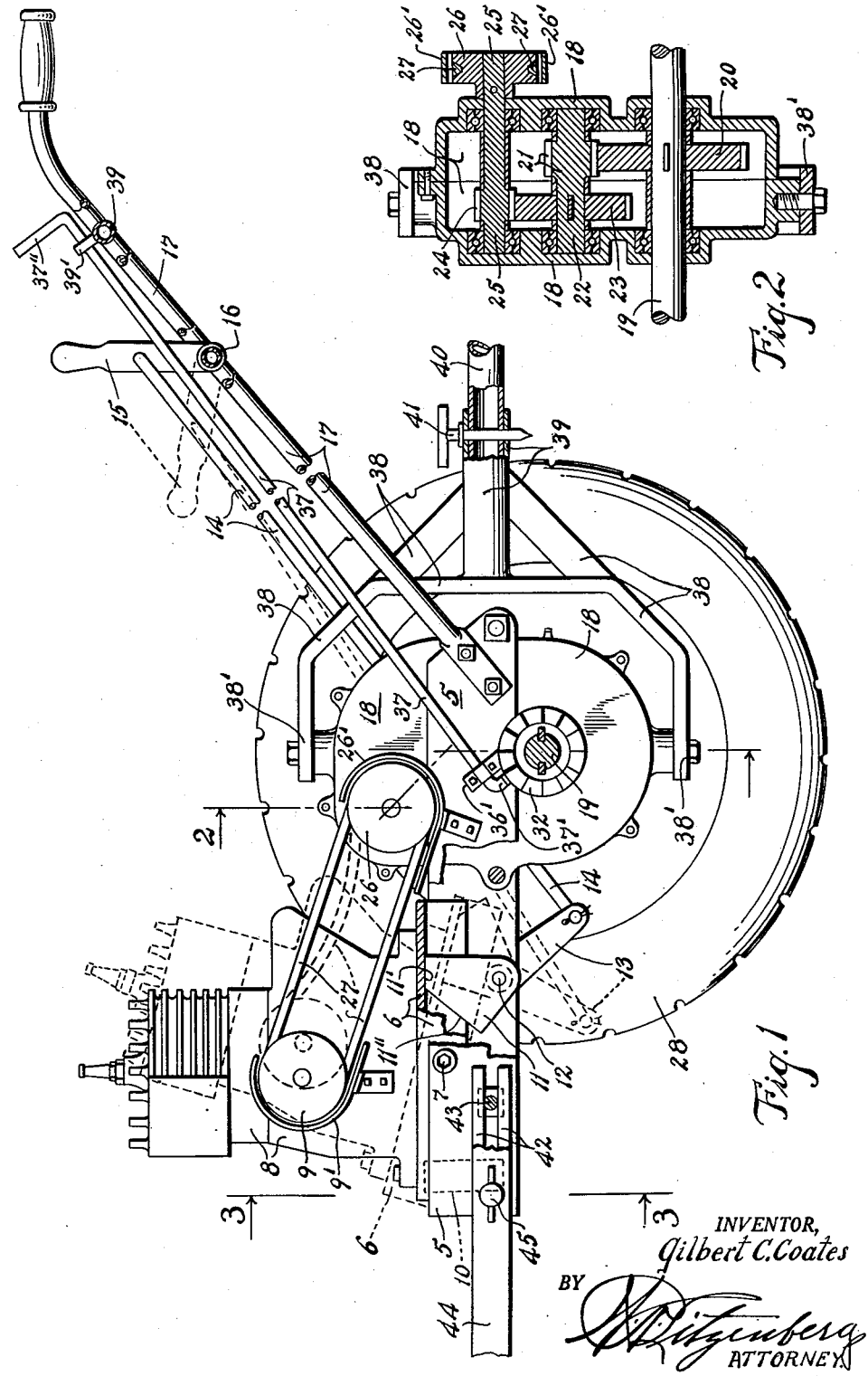

Oct. 23, 1951 — G. C. COATES — 2,572,109
GARDEN TRACTOR
Filed Dec. 10, 1947 — 2 SHEETS—SHEET 2
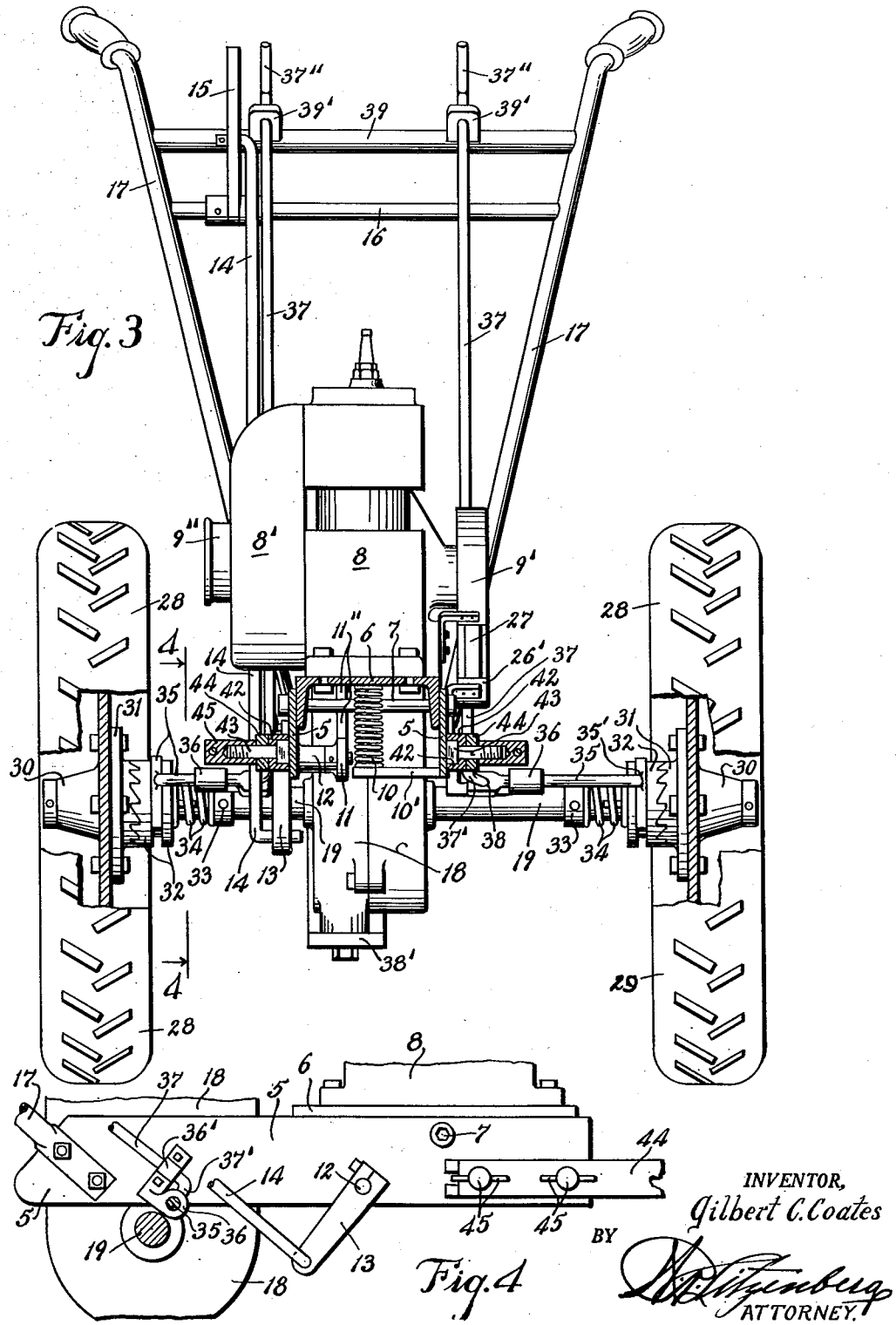
INVENTOR,
Gilbert C. Coates
BY
ATTORNEY.

Patented Oct. 23, 1951

2,572,109

UNITED STATES PATENT OFFICE 2,572,109

GARDEN TRACTOR

Gilbert C. Coates, Redlands, Calif.

Application December 10, 1947, Serial No. 790,839

1 Claim. (Cl. 180—19)

This invention relates to garden tractors of the smaller type, which are motor propelled, and which are hand controlled by the operator walking behind and manipulating the control mechanisms.

Among the salient objects of this invention are: to provide a garden tractor of the character referred to with improved hitching means for attaching different implements thereto to be pulled thereby; to provide an improved hitching means in the front of said tractor for coupling thereto implements or vehicles which are to be pushed instead of being pulled; to provide in combination with the motor which furnishes the driving power for said garden tractor, simple means for releasing the driving power from the motor to the train of gears which propels the tractor wheels; to provide simple and effective clutch means at each tractor wheel, whereby either or both wheels can be released from the power, thus making it convenient and effective to control the mechanism in stopping, or in turning in either direction according to the desire of the operator.

Other objects and advantages will be apparent from the following description of one practical embodiment of my invention, taken with the accompanying two sheets of drawings, in which:

Figure 1 is a side elevation of a garden tractor embodying my invention, with the tractor wheel on the near side removed to disclose the other mechanism and with parts in section;

Figure 2 is a detail of the gear case and gears therein, taken on the line 2—2 of Fig. 1;

Figure 3 is a front elevation of said garden tractor, as seen from the section line 3—3 on Fig. 1, with parts broken away and in section; and Figure 4 is a fragmentary side view as seen from the section line 4—4 on Fig. 3, along one of the side members and the gear case, and showing the connections of different control levers and the front coupling means.

Referring now in detail to the drawings, my garden tractor as here shown, includes a supporting body composed of two side members or plates 5, 5, seen in section in Fig. 3, and in side view in Fig. 1 and Fig. 4. Mounted between said side plates 5, 5, at its forward end is a channel member 6, with a pivot bolt 7 therethrough and through said side members, whereby said channel member constitutes a support for the motor and can be tilted. The motor is designated 8, and is seen in side elevation in Fig. 1, with its drive pulley 9, clearly indicated, said support 6 and said motor 8 being shown in a tilted condition in light broken lines.

Under the end of said support 6, is a coiled spring 10, supported on a supporting member 10' between said side members 5, 5, and tending normally to move said support and said motor to the tilted position.

Under the rearward end of said support 6 is an angular cam member 11, on a pivot shaft 12, with an operating lever or arm 13 depending therefrom, and connected by a rod 14 to a hand lever 15, pivotally mounted on a cross shaft 16, between the two side members of the handle bars 17, 17, as seen in Fig. 3, and in section in Fig. 1, in which said hand lever is shown forwardly in light broken lines for tilting the channel member and motor to the tilted position. The cam member 11 is shown in full lines with one of its straight sides 11' under the channel member support, supporting it in the full line position. When the hand lever 15 is moved forwardly, said cam member 11 is rocked or turned downwardly to bring its other straight side 11" under said channel member 6, in its tilted position as indicated in the light broken line position in Fig. 1.

A gear case 18 is shown mounted between the side members 5, 5, said gear case being in two halves, bolted together, as will be understood by reference to Fig. 2.

A main axle 19, constituting the drive shaft, is shown extended through said gear case, with a gear 20 keyed thereto, in mesh with a small gear 21 on a shaft 22, on which also is a larger gear 23, in mesh with a smaller gear 24, on a power shaft 25, on the outer end of which is mounted a drive pulley 26, and which is connected with the drive pulley 9 of the motor, with a drive belt 27, as clearly indicated in said Fig. 1.

On the opposite ends of said axle and drive shaft are two traction wheels, 28 and 29, each having a hub, as 30, with a ratchet clutch member, as 31 bolted thereto and through which said wheels are driven. Also on the opposite ends of said axle, next to said clutch members 31, 31, are companion members, as 32, 32, keyed to said shaft or axle to turn therewith and to slide thereon into and out of engagement with the wheel clutch members 31, 31. A collar, as 33, is also secured to said shaft or axle, at each end, with a coiled spring, as 34, between said collar and said slidable ratchet member 32, whereby said slidable clutch members are normally held yieldingly in driving engagement with the wheel clutch members 31, 31.

Connected with each of said slidable ratchet clutch members 32, 32, is a pull rod, as 35, 35, having a fork connection with the clutch members, as at 35', 35', which pull rods operate through a supporting bearing bracket at each side, designated 36, 36, secured to the opposite side plates 5, 5, and which bearing brackets also form a bearing at 36', at each side, for an operating rod 37, one of said bearing brackets being seen in Fig. 4, on the side plate 5.

Said operating rods 37, 37 have angle ends, as 37', connected with said pull rods, as at 38, 38, at opposite sides of said machine, whereby as either of said operating rods is turned, it pulls its pull rod 35 and said slidable clutch member 32 out of engagement with the wheel clutch member 31, thus releasing either wheel to turn freely on said axle 19. Said operating rods 37, 37, are extended to the handle bars 17, 17, and are anchored in a cross member 39, and are provided with an angle handle portion, as 37'', 37'', at their upper ends and conveniently positioned for operating the ratchet members 32, 32 when it is desired to disconnect either wheel from the driving clutch members 31, 31.

One of the important features of this invention is the coupling member or yoke, designated 38, which has its two arms pivotally connected with the top and bottom of the crank case 18, as at 38', 38' and terminating in a tubular connecting member 39, for coupling any other implement or member thereto. This is accomplished, as indicated in Fig. 1, by inserting the tubular tongue or connecting member 40 of such implement, into the connecting member 39, as indicated, with a T-pin 41 inserted therethrough.

It is sometimes desired to couple an implement or push machine in front of said garden tractor, so I have provided on the opposite outer sides of the front ends of the side members 5, 5, spaced angle members, as 42, 42, forming an open channel in each case adapted to receive the square heads of bolts, as 43, which would be carried on the ends 44 of the implement or machine to be connected therewith, as seen in Figs. 1, 3 and 4. Tubular nuts, as 45, with T-handles, are shown screwed on to the bolts 43, for tightening the ends 44 of the coupling members with the channel members 42, as will be clear from the sectional view in Fig. 3, thus making a firm coupling for any implement or machine to be pushed.

The two handle bars or members 17, 17, are secured to the side plates 5, 5, as seen in Figs. 1 and 4, and the operating rods and levers 37, 37 and 14 are extended to the cross bars 16 and 39 of said handle bars, as before described. The operating rods 37, 37 are to be turned by their angle portions 37'', 37'' for operating the pull rods 35, 35, for disconnecting the drive clutch members 31—32.

When it is desired to tilt the motor 8 and its supporting member 6, to slacken the belt drive 27, as indicated in light broken lines in Fig. 1, it is only necessary for the operator to push the lever 15 forwardly, as indicated in the light broken line position thereof. Said belt 27, over each of the pulleys 9 and 26, is provided with guard members, designated 9' and 26' in said Fig. 1, and also in Fig. 3.

I do not limit my invention to the details of construction and arrangement shown for explanatory purposes, except as I may be limited by the hereto appended claim.

I claim:

In a garden tractor, a pair of traction wheels with an axle therebetween, a pair of side plates or members extending forwardly from said axle, a gear case between said side plates at said axle and through which said axle extends, a motor mounted between said side plates forwardly of said gear case and connected therewith for driving said axle through said gear case, a coupling member of fork form having its arms pivotally connected with the top and bottom of said gear case and terminating in a connecting extension for connection to an implement to be pulled by said tractor, and coupling means at the forward end of said side plates for connecting an implement to be pushed by said tractor, said coupling means including two channels to receive the heads of bolts and tubular nuts for said bolts for tightening said heads in said channels, substantially as illustrated.

GILBERT C. COATES.

REFERENCES CITED

The following references are of record in the file of this patent:

UNITED STATES PATENTS

| Number | Name | Date |
| --- | --- | --- |
| 705,894 | Arnold | July 29, 1902 |
| 1,695,849 | Insley | Dec. 18, 1928 |
| 1,817,873 | Bready | Aug. 4, 1931 |
| 2,256,583 | Squires | Sept. 23, 1941 |
| 2,401,796 | Raitch | June 11, 1946 |
| 2,461,391 | Osterhaus | Feb. 8, 1949 |

FOREIGN PATENTS

| Number | Country | Date |
| --- | --- | --- |
| 773,328 | France | Sept. 3, 1934 |